April 26, 1966   H. R. DOLF ETAL   3,248,205
GLASS MELTING FURNACE WITH SUBMERGED GAS BURNERS
Filed Dec. 21, 1962
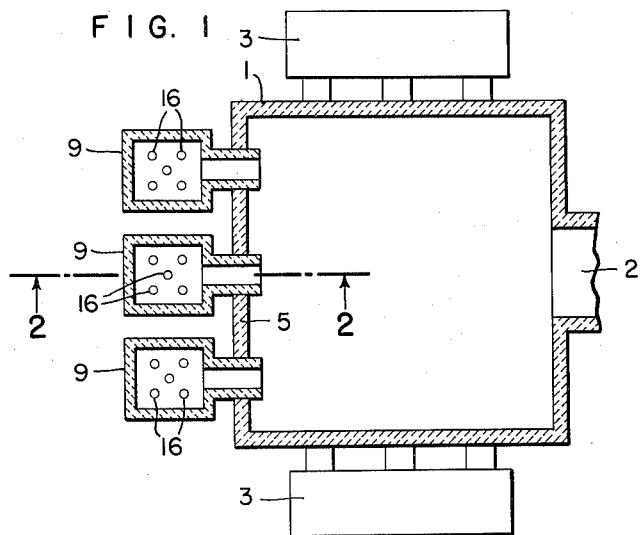
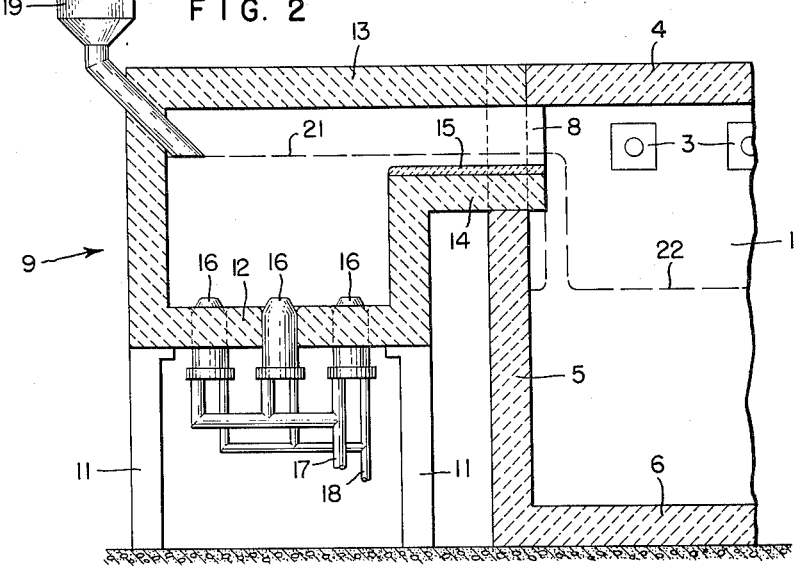
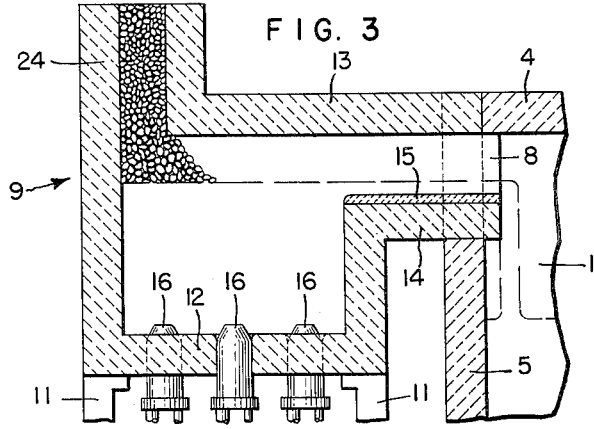
INVENTORS.
HANS R. DOLF
WILLIAM E. MARCEAU
BY
ATTORNEY.

3,248,205
GLASS MELTING FURNACE WITH SUBMERGED GAS BURNERS
Hans R. Dolf, Wayne, and William E. Marceau, Havertown, Pa., assignors to Selas Corporation of America, Dresher, Pa., a corporation of Pennsylvania
Filed Dec. 21, 1962, Ser. No. 246,615
2 Claims. (Cl. 65—335)

The present invention relates to the melting of glass and more particularly to apparatus in which glass can be melted in large quantities in a relatively small area.

In glass tanks, and particularly large tanks adapted to produce many tons of glass per day, a large melting and refining area is required to produce glass that is free from seeds and bubbles. Ordinarily about one-third of the area of a tank is devoted to the melting of the batch and cullet that is used as raw material, while the remainder of the area is used for fining the glass before it is drawn off for use. If some way can be provided for improving the melting technique for glass, the furnace size can be reduced approximately one-third while still leaving the same area for fining of the glass.

It is an object of the present invention to provide a plurality of small, high efficiency melting units for use with a large glass refining tank. It is a further object of the invention to provide a method of supplying molten glass to a glass refining tank.

In practicing the invention there are provided a plurality of high efficiency melting units that supply molten glass to a large refining tank. These melting units are fired by submerged combustion to melt and thoroughly mix the ingredients of the glass so that, when it is delivered to the refining tank, only the fining step must take place in a conventional manner before the glass is delivered to the point of use.

The various features of novelty which characterize our invention are pointed out with particularity in the claims annexed to and forming a part of this specification. For a better understanding of the invention, however, its advantages and specific objects attained with its use, reference should be had to the accompanying drawings and descriptive matter in which we have illustrated and described a preferred embodiment of the invention.

In the drawings:
FIG. 1 is a view, in section, of a glass refining tank and melting tanks used therewith.
FIG. 2 is an enlarged view, in section, taken on line 2—2 of FIG. 1, and
FIG. 3 is a view similar to FIG. 2 showing a modified form of melting tank.

Referring to FIG. 1, there is shown a large refining tank 1 in which the melted glass is refined as it is flowing from the melting tanks toward an outlet 2 for use in any desired glass using apparatus. This tank is heated in a conventional manner by recuperators which include burners and which are shown diagrammatically on each side of the furnace at 3. The furnace is provided with a roof 4, a side wall 5 and a floor 6, in addition to other side walls through which the recuperators extend. Glass is supplied to the tank 1 through openings 8 formed in the upper part of side wall 5 from a plurality of melting tanks 9.

Each of the melting tanks is mounted in an elevated position on supports 11 which engage the floor of the tank. Each tank is provided with side walls and a roof 13, which roof extends over a discharge spout 14 having a glass resistant wear plate 15 on its upper surface. Each of the discharge spouts of the metling tanks is sized so that it will fit snugly within an opening 8 with the roof 13 of the melting tank aligned with the roof 4 of the refining tank. These tanks are built so that the floor 11 of the melting tank is at an elevation above the level of the floor 6 of the refining tank, so that the depth of the glass in the melting tank is not as great as the depth of the glass in the refining tank. While these tanks are shown as being on stationary supports 11, it is possible to mount them on rollers and tracks so that they can be moved from the position shown with relation to the refining tank away from the refining tank, if necessary. When a melting tank is moved away from the refining tank, the opening 8 will be closed by a suitable refractory door.

The melting tanks are similar to those disclosed in our co-pending application Serial No. 242,515, filed December 5, 1962, and are fired in a similar manner by means of burners 16 which extend through the bottom of the furnace at spaced locations therein. These burners are of the type disclosed in the above mentioned co-pending application, and are supplied with gas and air through supply manifolds 17 and 18 respectively. Glass forming material, such as batch or cullet, is charged to each of the melting tanks by means of a supply spout 19 which extends through the back wall of the tank. The lower end of the spout 19 is substantially at the level at which glass is maintained in the tank, which is indicated herein at 21. Glass flows from this tank through spout 14 to the glass in refining tank 6 and is indicated therein as being at a level 22. It will be noted that the depth of glass in the refining tank is considerably greater than the depth of glass in the melting tank.

The arrangement shown in FIG. 3 is similar to that of FIG. 2, except that the roof of the melting tank in this case is provided with an exhaust stack 24. In this case the glass making material is charged through the exhaust stack into the melting furnace, and is melted therein as was the batch supplied through spout 19 in FIG. 2.

In operating the apparatus the burners 16 are ignited and, as explained in the above identified co-pending application, discharge hot products of combustion into melting tank 9. These products of combustion travel upwardly through the glass to heat it, and at the same time set up convection currents in the glass which mix the glass and fresh ingredients deposited through spout 19 to form a homogenous mass of substantially uniform viscosity. As fresh ingredients are added, they are pulled into the molten mass and mixed as they are being melted. The products of combustion leave the glass at substantially the same temperature as the glass and travel through openings 8 over the discharge spout 14, to be exhausted from tank 1 through recuperators 3.

The melting tanks are of such a size that the molten glass is from 18 to 24 inches in depth. Such a depth has been found to require only reasonable pressures for the air and gas supplies to the burners for efficient melting. Liquid glass flows continuously from discharge spouts 14 into fining tank 1 where the glass can have a depth of several feet. Tank 1 is heated in a conventional manner by burners and recuperators, with the burners firing across the tank above the glass. In this manner the glass is maintained at the proper temperature and viscosity for refining as it flows through the tank.

The number of burners in each of the melting tanks will depend upon the capacity of the tank, and the number of melting tanks used for each refining tank will depend upon the capacity of the latter. The refining tank will have a capacity substantially equal to the capacities of all of the melting tanks. Ordinarily, however, the capacity of the melting tanks used with each refining tank will be somewhat more than is necessary for the capacity of the refining tank. In this way the melting tanks can normally be fired slightly under capacity without materially decreasing their efficiency, but can be fired at or above capacity when one of them must be shut down for service or repairs. The large refining tank, where the wear is much less severe, can thus be run continuously. By removing the melting function from the refining tank, the length of a campaign can be materially increased.

With the construction shown in FIG. 3, some or all of the products of cumbustion rising through the glass will be discharged through stack 23, thus preheating the material being supplied to the tank. This arrangement increased the efficiency of the melting operation, but should only be used if the raw materials are cullet or pelletized batch. Loose raw material should be supplied, as shown in FIG. 2, closely adjacent to or under the glass surface.

In operating the tank fuel and air are supplied to burners 16 at a pressure of about one pound per square inch for each foot of glass depth plus the pressure drop in the system. The burners are so designed, as described in the above mentioned co-pending application, that the fuel and air are completely burned in them with hot products of combustion at about 3000° F. being discharged through the glass to raise its temperature to about 2200° F. A convenient size for each burner will depend upon the capacity of the melting tank and will be about 500,000 B.t.u. per hour or larger. The number of burners used in each tank will depend upon its size and rating. Using submerged combustion with burners of the type shown reduces the tank size substantially, since a melting area of only one-half square foot is required for a capacity of a ton per day. This compares with from four to six square feet per ton per day for conventional commercial melting of glass, or from eight to twelve times the area of the melters described herein.

It will be seen that we have provided a novel arrangement of apparatus for melting large quantities of glass. The arrangement insures that all of the ingredients will be melted before they reach the fining tank, thus contributing to its life. Also, since the refining tank is supplied with glass from a plurality of sources, each of which can be repaired or replaced independently of the other, the continued operation of the tank for its full life is insured.

While in accordance with the provisions of the statutes, we have illustrated and described the best form of embodiment of our invention now known to us, it will be apparent to those skilled in the art that changes may be made in the form of the apparatus disclosed without departing from the spirit and scope of the invention set forth in the appended claims, and that in some cases certain features of our invention may be used to advantage without a corresponding use of other features.

What is claimed is:

1. Apparatus for making glass including structure forming a glass refining tank having side walls and a bottom at a given level, burners in some of said side walls above the level of the glass in said refining tank, one of said side walls being provided with a plurality of openings above the level of the glass in said refining tank, means forming a plurality of glass melting tanks each having side walls, a bottom and a discharge spout projecting from one side wall, means to mount a melting tank with a discharge spout thereof extending into each of said openings and beyond said one side wall, the bottom of said melting tanks being above the level of the bottom of said refining tank, a burner extending into the bottom of each melting tank below the level of the glass therein, and means to supply glass making material to each of said melting tanks, the glass flowing therefrom through its discharge spout directly into said refining tank.

2. Apparatus for making glass comprising a plurality of melting tanks each having a liquid glass discharge spout extending therefrom, means to supply glass making material to each of said tanks, burner means extending through the floor of each of said tanks for supplying heat thereto to melt glass therein, a glass refining tank having sides and having a capacity substantially equal to the combined capacity of said melting tanks, said refining tank being provided with a plurality of openings in at least one of said sides, means to mount said melting tanks relative to said refining tank so that a discharge spout of the latter extends through each opening beyond the side to discharge glass directly into said refining tank, and means to heat the glass in said refining tank.

References Cited by the Examiner
UNITED STATES PATENTS

| | | | |
|---|---|---|---|
| 1,596,058 | 8/1926 | Mambourg | 65—135 |
| 2,634,555 | 4/1953 | Henry et al. | 65—135 |

DONALL H. SYLVESTER, *Primary Examiner.*

A. D. KELLOGG, *Assistant Examiner.*